Jan. 5, 1954     W. H. HARSTICK     2,664,905
CENTRIFUGALLY OPERABLE VALVE RING
FOR CENTRIFUGAL SEPARATORS
Original Filed June 24, 1946
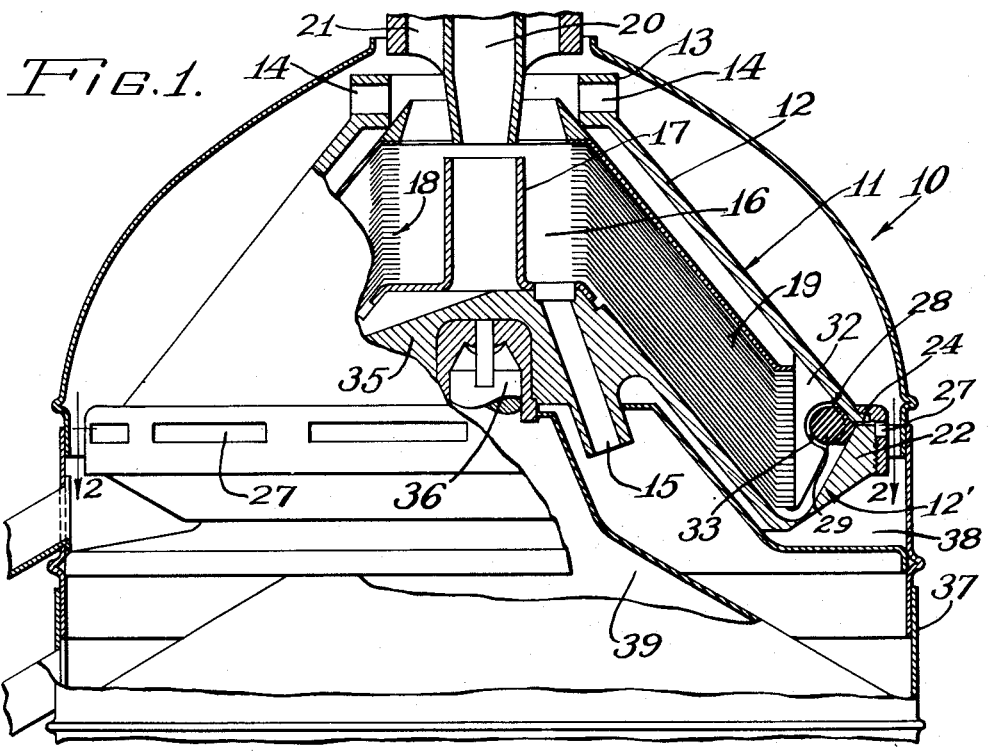
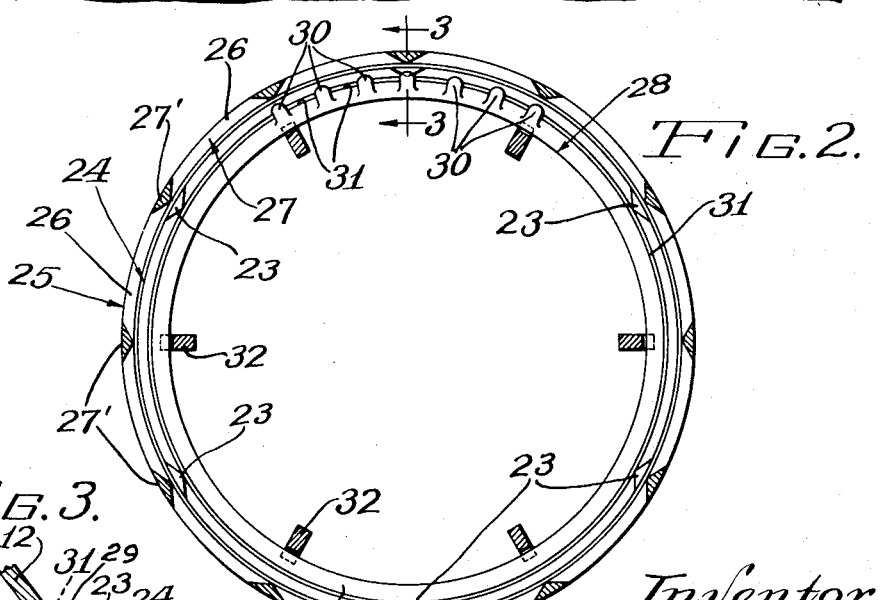
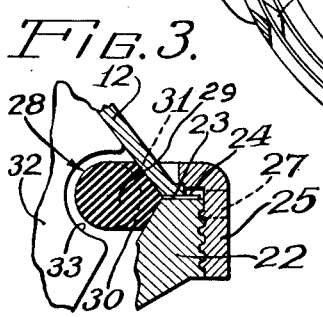
Inventor:
William H. Harstick
Paul O. Pippel
Atty.

Patented Jan. 5, 1954

2,664,905

UNITED STATES PATENT OFFICE 2,664,905

CENTRIFUGALLY OPERABLE VALVE RING FOR CENTRIFUGAL SEPARATORS

William H. Harstick, Oak Park, Ill., assignor to International Harvester Company, a corporation of New Jersey Original application June 24, 1946, Serial No. 678,863, now Patent No. 2,504,261, dated April 18, 1950. Divided and this application December 29, 1949, Serial No. 135,689

5 Claims. (Cl. 137—56)

This is a division of my application Serial No. 678,863, filed June 24, 1946, now Patent No. 2,504,261, dated April 18, 1950, for a Cream Separator.

The present invention relates to an improved centrifugally operable valve ring for utilization in a power-washing cream separator.

The prime object of this invention is to provide a self or power-washing cream separating bowl having an improved centrifugally operable valve ring for controlling the discharge of washing liquid from the bowl.

Another object is to provide a centrifugal valve ring for a power-washing cream separator, the valve ring being constructed of a rubber-like material having a plurality of spacer elements projecting outwardly from a peripheral sealing surface on the ring.

The type of centrifugal separating bowl with which the present centrifugal valve means is utilized consists essentially of upper and lowering casing members having a substantially continuous discharge outlet formed at the maximum periphery of the bowl. A centrifugal valve ring is positioned inwardly of and adjacent to the continuous discharge outlet or opening. The valve ring is coextensive with the discharge opening and is adapted to be expanded outwardly for engaging and sealing the opening during high speeds of rotation of the bowl. When it is desired to wash the interior of the bowl with a washing liquid, the rotating speed of the centrifugal bowl is considerably reduced. In applicant's improvement the valve ring includes a plurality of circumferentially spaced spacer elements which exert a resilient thrust inwardly on the centrifugal valve ring to space the ring inwardly from the opening during such a decrease in the speed of rotation. In this position washing liquid may be directed to the inner chamber of the bowl, the washing liquid thereupon escaping through the discharge opening for flushing the interior of the bowl.

Further objects will become apparent in the more detailed description which follows:

Figure 1 of the drawings is a side elevational view of a cream separator bowl including adjacent housing structure, the bowl having portions broken away to illustrate the invention.

Figure 2 is a sectional view of a centrifugal valve ring showing its relation to the separator bowl, the view being taken substantially along the line 2—2 of Figure 1.

Figure 3 is a sectional view taken along the line 3—3 of Figure 2 showing a portion of a centrifugal valve ring.

Referring to the drawing, a centrifugal separator structure is generally designated by the reference character 10. The separator structure 10 includes a rotatable separating bowl 11. The separating bowl 11 includes an upper bowl shell 12 and a lower bowl portion 12'. The upper bowl shell 12 is provided near its axis with a collar 13 having a pair of conventional skimmed milk outlets 14. The lower bowl portion 12' is provided with a downwardly projecting cream outlet 15. The cream outlet 15 is in direct communication with a washing liquid receiving space 16. The receiving space 16 is provided with an upwardly extending milk inlet tube 17, the milk inlet tube 17 being spaced a considerable distance inwardly from the inner peripheral edges 18 of a plurality of superposed separating disks 19.

A milk feed tube 20 is positioned above the milk inlet tube 17, the milk feed tube 20 being in axial alignment for directing quantities of whole milk to the milk inlet tube 17. A washing liquid tube 21 is provided adjacent the milk feed tube 20, the washing tube being arranged to direct a large quantity of washing liquid to the washing liquid receiving space 16.

The lower bowl portion 12' includes a peripheral portion 22 which is provided with a plurality of diverging spacer elements 23 positioned in circumferentially spaced relation. The spacer elements 23 are best shown in Figures 2 and 3, these elements functioning to space the upper bowl shell 12 from the peripheral portion 22 to provide a substantially continuous annular discharge opening 24.

The upper bowl shell 12 and the lower bowl portion 12' are held in assembled relation by means of a threaded clamping ring 25. The clamping ring 25 is provided with a plurality of circumferentially spaced slots 26 providing in effect a substantially continuous annular discharge opening 27. The discharge opening 27 is in direct registry with the discharge opening 24, the continuity of the discharge opening 27 being broken only by the utilization of a plurality of diverging spacers 27' which are circumferentially spaced within the opening 27.

A centrifugal valve member 28 is positioned within the bowl 11 which constitutes a seat therefor. The centrifugal valve member 28 comprises a ring 29 of deformable elastic material. The present disclosure shows the ring 29 to be made of a rubber-like material but it must be understood, of course, that any material having elastic qualities might be substituted therefor. The ring 29 is provided with a plurality of circumferentially spaced projections 30. The projections 30, as best shown in Figure 3, are integrally formed with the ring 29 and project outwardly with respect thereto from a sealing edge 31. The ring 29 is positioned so that the sealing edge 31 is placed immediately adjacent the annular discharge opening 24. The ring 29 is supported by means of a plurality of wing portions 32 depending from the upper bowl shell 11. The wing portions 32 are provided with cut-outs 33 which serve as supporting means for the valve ring 29.

The lower bowl portion 12' is provided with a central portion 35 which is adapted to connect to a drive shaft 36 in driving relation. The drive shaft 36 may be connected to a power unit, not shown, for effecting rotation of the bowl 11.

The bowl 11 is suitably supported within a tinware structure 37, the tinware structure 37 including a skim milk receiving chamber 38 and a cream receiving chamber 39.

*Operation*

It is believed unnecessary to describe the function of the cream separator bowl 11 during the separating operation since this function is well known to those skilled in the art. During the washing operation washing liquid enters into the bowl 11 through the washing liquid tube 21. The washing liquid is distributed to the space 16 whereupon the centrifugal rotation of the bowl flings the washing liquid outwardly between the inner peripheral edges 18 of the disks 19 to effect proper washing of the same.

During the high speed rotation of the separating bowl 11, the valve ring has expanded outwardly in response to centrifugal force in a manner wherein the sealing edge 31 is seated tightly against the discharge opening 24 effectively sealing said opening. The high speed of rotation has caused the sealing ring 29 to expand in a manner overcoming the elastic force exerted by the spacer elements or projections 30 which would under lower speeds of rotation space the sealing edge 31 inwardly from the opening 24 as best shown in Figure 3. As additional liquid is directed to the separating bowl the speed of rotation of the separating bowl is materially reduced. At a predetermined speed of rotation the resilient projections 30 are effective to exert a thrust radially inwardly against the valve ring 29 whereupon the valve ring is unseated from the discharge opening 24 as best shown in Figures 2 and 3. The washing liquid thereupon can escape outwardly through the discharge openings 26 and 27 thereby effectively flushing the interior parts of the bowl.

Applicant by his novel construction has provided an effective means whereby the sealing ring may be spaced from the discharge opening during a lowering of the speed of rotation of the bowl. It is extremely important to effect a complete opening of the discharge outlet so that the washing liquid can be quickly and effectively flushed therethrough. By utilizing a plurality of spacer elements in the manner shown, applicant has accomplished this desirable object. The spacer elements will exert a resilient thrust inwardly against the sealing ring during a lowering of the speed of rotation. The projections are spaced circumferentially at equal distances and therefore the inward resilient pressure against the valve ring is consistent throughout the peripheral edge of said ring.

It must be understood that various changes may be made in the design of the centrifugal valve ring without departing from the spirit of the invention as disclosed nor the scope thereof as defined in the appended claims.

What is claimed is:

1. A centrifugally rotatable valve construction comprising a rotatable valve seat having a discharge opening, an annular rubber-like sealing element positioned adjacent said valve seat, and a plurality of projections on said sealing element, said projections being circumferentially spaced around a peripheral edge of said sealing element for engaging the valve seat during rotation of said valve member whereby said sealing element is retained in laterally spaced relation relative to said discharge opening, said sealing element being centrifugally expansible during high speeds of rotation for engaging and sealing said discharge opening.

2. A centrifugally rotatable valve construction in accordance with claim 1, said projections being comprised of a rubber-like material and being circumferentially spaced about the outer peripheral edge of said sealing element.

3. A centrifugally rotatable valve construction in accordance with claim 2, said discharge opening being substantially coextensive with said annular sealing element.

4. A centrifugally rotatable valve construction in accordance with claim 3, said projections being integral with said sealing element.

5. A centrifugally rotatable valve construction comprising an annular rotatable valve seat having a substantially continuous annular discharge opening, a ring of deformable elastic material supported adjacent said discharge opening, and a plurality of rubber-like projections extending laterally outwardly from the outer peripheral edge of said ring, said projections being adapted to resiliently space the outer peripheral edge of said ring from said discharge opening, said ring being expansible upon rotation of said valve construction for engaging and sealing said discharge opening.

WILLIAM H. HARSTICK.

References Cited in the file of this patent
UNITED STATES PATENTS

| Number | Name | Date |
|---|---|---|
| 1,157,574 | Mueller | Oct. 19, 1915 |
| 1,536,785 | Gold | May 6, 1925 |
| 2,482,570 | Acton | Sept. 20, 1949 |
| 2,555,542 | Hintz | June 5, 1951 |